United States Patent [19]

Tu et al.

[11] 4,263,174

[45] Apr. 21, 1981

[54] LOW COKE-MAKE FCC CATALYST

[75] Inventors: Hosheng Tu, Shorewood; David C. DeCoster, Countryside, both of Ill.

[73] Assignee: UOP Inc., Des Plaines, Ill.

[21] Appl. No.: 70,935

[22] Filed: Aug. 29, 1979

[51] Int. Cl.³ .............................................. B01J 29/08
[52] U.S. Cl. .................................. 252/455 Z; 208/120
[58] Field of Search ...................... 252/455 Z; 208/120

[56] References Cited

U.S. PATENT DOCUMENTS

| | | | |
|---|---|---|---|
| 3,556,988 | 1/1971 | Stover et al. | 208/120 |
| 3,823,092 | 7/1974 | Gladrow | 252/455 Z |
| 3,930,987 | 1/1976 | Grand | 208/120 |
| 4,107,088 | 8/1978 | Elliott, Jr. | 252/455 Z |
| 4,137,151 | 1/1979 | Csicsery | 252/455 Z |

*Primary Examiner*—Carl F. Dees

*Attorney, Agent, or Firm*—James R. Hoatson, Jr.; Louis A. Morris; William H. Page, II

[57] ABSTRACT

A catalytic composite, its method of manufacture and use is disclosed. The composite comprises a zeolitic crystalline aluminosilicate dispersed in a porous inorganic oxide carrier material comprising silica, alumina or zirconium and a constituent comprising the ions of one or more rare earths with the weight ratio on a volatile free basis of the rare earth ions to the carrier material being greater than 1.0:100.0. The method of manufacture of the composite comprises mixing a catalyst powder comprising the zeolite dispersed in a porous inorganic oxide carrier material with a solution of a salt of the rare earth, separating a filter cake from the slurry by a means not involving the washing of the filter cake and calcining the filter cake. The catalytic composite may be used in a process for cracking a hydrocarbon charge stock.

8 Claims, No Drawings

LOW COKE-MAKE FCC CATALYST

BACKGROUND OF THE INVENTION

1. Field of the Invention

The fields of art to which the claimed invention pertains are catalytic composites as well as the manufacture and use thereof. More specifically, the claimed invention relates to the composition, method of manufacture and use of a catalytic composite comprising a zeolitic crystalline aluminosilicate dispersed in a porous inorganic oxide carrier material having a constituent comprising one or more rare earth oxides.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking (FCC) process in which heavy petroleum hydrocarbon feed stocks boiling in excess of about 400° F. are converted to lower boiling hydrocarbons in the motor fuel boiling range by heating them in contact with an amorphous silica-alumina catalyst maintained in a fluidized state. While other composites comprising silica, e.g. silica-zirconia, silica-magnesia, etc., have been known to catalyze the cracking reaction, the silica-alumina composite has been by far the most widely accepted catalyst in the industry. More recently, improved catalysts having the capability of yielding greater proportions of high octane gasoline have been prepared by the inclusion of a finely divided zeolite, or crystalline aluminosilicate, either naturally occurring or synthetically prepared, within the amorphous silica-alumina matrix. Prior inventors have prepared, tested and compared hydrocarbon conversion catalysts comprising a finely divided crystalline aluminosilicate distributed in an amorphous silica matrix on the one hand, and in an amorphous silica-alumina matrix on the other hand. Examples of such catalysts are as described or claimed in U.S. Pat. Nos. 3,312,615; 3,392,110; 3,503,874; 3,592,778; 3,669,903; 3,696,023; 3,849,291; 3,926,778; 3,939,058; 4,001,106 and 4,100,219.

The FCC reaction produces, in addition to the desirable products, such as the high octane gasoline, a quantity of undesirable products such as the carbonaceous material or coke that deposits on the catalyst. The above mentioned zeolite containing catalysts enable minimization of these undesirable products while maximizing the conversion to the desirable products. Continuous efforts are being made, however, to improve the performance of even the zeolite containing catalysts.

There are many zeolite containing FCC catalysts described in the art other than those mentioned above which achieve improved performance by the addition of certain ingredients either to the catalyst itself or to the materials used in the manufacture of the catalyst at one or more of the manufacturing stages. For example, U.S. Pat. No. 3,471,410 discloses a method of reducing coke formation and improving the selectivity and efficiency of a fluid catalyst by incorporating zirconium in the silica-alumina gel which is a precursor of the catalyst. Likewise, U.S. Pat. No. 4,107,088 teaches addition of additives such as titania, zirconia, iron oxide and ceria (a rare earth) to the FCC catalyst precursors. U.S. Pat. No. 3,556,988, on the other hand, teaches the post catalyst formation ion exchange of the sodium contained in the zeolite constituent of the catalyst by treatment with an aqueous solution of a rare earth.

We have discovered a catalytic composite and a method for its manufacture which when used in a process for cracking a hydrocarbon charge stock enables improved conversion to desirable products with a reduction in coke production.

SUMMARY OF THE INVENTION

It is, accordingly, a broad objective of our invention to obtain a novel catalytic composite. Another objective is to provide a method for the manufacture of such composite. A third objective is to provide a process for cracking a hydrocarbon charge stock in which said novel catalytic composite is used.

In brief summary, our invention is, in a first embodiment, a catalytic composite comprising a zeolitic crystalline aluminosilicate dispersed in a porous carrier material comprising oxides of one or more trivalent carrier materials and one or more quadravalent elements, the carrier having impregnated therein the ions of one or more rare earths. The weight ratio on a volatile free basis of the rare earth ions to the porous carrier material are greater than 1.0:100.0.

In a second embodiment, our invention is a method of manufacturing a catalytic composite comprising: (a) preparing a slurry of a catalyst powder comprising a zeolitic crystalline aluminosilicate dispersed in a porous carrier material comprising oxides of one or more trivalent metals and one or more quadravalent elements by mixing the powder with an aqueous solution of a water soluble rare earth salt, the quantity of solution and concentration of the salt in the solution being sufficient to impart a weight ratio of the ions of the rare earth to the carrier material greater than 1.0:100.0 upon completion of the following step (c); (b) separating a filter cake containing the catalyst powder from the slurry by a means not involving the washing of the filter cake; and (c) calcining the filter cake at calcining conditions to obtain the catalytic composite.

In still other embodiments, our invention is a process for cracking a hydrocarbon charge stock which comprises contacting the charge stock with the catalytic composite of the first embodiment or with the catalytic composite prepared by the method of the second embodiment at cracking conditions.

Other objectives and embodiments of our invention encompass details about composite ingredients, steps in the manufacture and chemicals and conditions used in such manufacture, all of which are hereinafter disclosed in the following discussion of each of the facets of our invention.

DESCRIPTION OF THE INVENTION

Zeolitic crystalline aluminosilicates as contained in the catalytic composite of the present invention occur both naturally or are synthesized. In hydrated form, the crystalline aluminosilicates generally encompass those zeolites represented by the Formula 1 following:

FORMULA 1

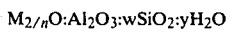

$M_{2/n}O:Al_2O_3:wSiO_2:yH_2O$ where "M" is a cation which balances the electrovalence of the aluminum-centered tetrahedra and which is generally referred to as an exchangeable cationic site. "n" represents the valence of the cation, "w" represents the moles of $SiO_2$, and "y" represents the moles of water. The generalized cation "M" may be monovalent, divalent or trivalent or mixtures thereof.

Crystalline aluminosilicates particularly useful comprise zeolites in either the X or Y form. The X zeolite in the hydrated or partially hydrated form can be represented in terms of mole oxides as shown in Formula 2 below:

FORMULA 2

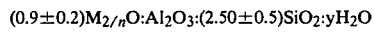

$(0.9\pm0.2)M_{2/n}O:Al_2O_3:(2.50\pm0.5)SiO_2:yH_2O$ where "M" represents at least one cation having a valence of not more than 3, "n" represents the valence of "M", and "y" is a value up to about 9 depending upon the identity of "M" and the degree of hydration of the crystal. As noted from Formula 2 the $SiO_2/Al_2O_3$ mole ratio of X zeolite is $2.5\pm0.5$. The cation "M" may be one or more of a number of cations such as a hydrogen cation, an alkali metal cation, or an alkaline earth cation, or other selected cations, and is generally referred to as an exchangeable cationic site. As the X zeolite is initially prepared, the cation "M" is usually predominately sodium, that is, the major cation at the exchangeable cationic sites is sodium, and the zeolite is therefore referred to as a sodium-X zeolite. Depending upon the purity of the reactants used to make the zeolite, other cations mentioned above may be present, however, as impurities. The Y zeolite in the hydrated or partially hydrated form can be similarly represented in terms of mole oxides as in Formula 3 following:

FORMULA 3

$(0.9\pm0.2)M_{2/n}O:Al_2O_3:wSiO_2:yH_2O$ where "M" is at least one cation having a valence not more than 3, "n" represents the valence of "M", "w" is a value greater than about 3 up to about 6, and "y" is a value up to about 9 depending upon the identity of "M" and the degree of hydration of the crystal. The $SiO_2/Al_2O_3$ mole ratio for Y zeolites can thus be from about 3 to about 6. Like the X zeolite, the cation "M" may be one or more of a variety of cations but, as the Y zeolite is initially prepared, the cation "M" is also usually predominately sodium. A Y zeolite containing predominately sodium cations at the exchangeable cationic sites is therefore referred to as a sodium-Y zeolite.

Cations occupying the exchangeable cationic sites in the zeolite may be replaced with other cations by ion exchange methods well known to those having ordinary skill in the field of crystalline aluminosilicates. Such methods are generally performed by contacting the zeolite or a base material containing the zeolite with an aqueous solution of the soluble salt of the cation or cations desired to be placed upon the zeolite. After the desired degree of exchange takes place the sieves are removed from the aqueous solution, washed and dried to a desired water content. By such methods the sodium cations and any non-sodium cations which might be occupying exchangeable sites as impurities in a zeolite can be partially or essentially completely replaced with other cations.

The preferred zeolite for use in the catalytic composite of the present invention is rare earth ion exchange Y-zeolite. The preferred rare earth for impregnation into the carrier material is lanthanum.

The zeolite in the catalytic composite of the present invention is dispersed in an amorphous porous matrix or carrier material comprising oxides of one or more trivalent metals and one or more quadravalent elements. The pores exist in and throughout the carrier material. The preferred carrier material is a combination of silica and alumina and may also contain zirconium oxide. An essential additional ingredient of the carrier material is ions of one or more rare earths in a sufficient amount to result in a weight ratio on a volatile free basis of rare earth ions to the carrier material greater than 1.0:100.0.

The method of manufacturing the catalytic composite of the present invention involves preparing a slurry of the zeolite and carrier material catalyst powder in an aqeous solution of the rare earth salt, separating a filter cake from the slurry and calcining the filter cake at calcining conditions to obtain the product catalytic composite. Separation of the filter cake from the slurry may be effected by any one of many physical separation techniques known to the art, such as filtering or centrifuging. It is essential to the present invention, however, that the filter cake not be washed. The preferred calcining conditions comprise a temperature of from about 200° C. to about 750° C. and a calcining time of from about 30 minutes to about 5 hours. It is most convenient to obtain the catalyst powder as a filter cake from a prior ion exchange procedure whereby sodium ions contained in the catalyst are exchanged with ammonium ions in an aqueous medium.

The method of manufacturing the catalytic composite of the present invention is similar to the cation exchange procedure as, for example, set forth in the aforementioned U.S. Pat. No. 3,556,988, but only to the extent of the basic teaching of contacting the catalyst slurry with the aqueous solution of rare earth salt. The concern of that reference is cation exchange of rare earth ions for the sodium ions at exchangeable cationic sites in the zeolite constituent of the catalyst, and, to achieve completeness of such exchange, a quantity of rare earth in excess of the stoichiometric amount required to exchange all such sodium may be used in the ion exchange solution. However, the exchange is followed by water washes (see column 11, lines 22 to 24 of said reference) prior to the drying of the catalyst, which effectively removes from the catalyst almost all of the rare earth salts in excess of the amount used in the ion exchange.

In contradistinction to U.S. Pat. No. 3,556,988, the method of the present invention prohibits washing of the filter cake prior to calcining. The rare earth treatment in accordance with the method of the present invention is, therefore, best described as an impregnation rather than an ion exchange procedure. The method of the present invention in fact produces a catalytic composite different than the composite of the known art, i.e. the carrier material of the catalytic composites of the present invention have a weight ratio of rare earth ion constituent to the carrier material greater than 1.0:100.0, a ratio which, as will be brought out in the following examples, is not achieved by the method of U.S. Pat. No. 3,556,988.

The catalytic composite of the present invention is intended to be used in a process for cracking a hydrocarbon charge stock at cracking conditions. The most common form of such a process is well known to the art as the fluid catalytic cracking process and is described in detail in numerous publications, such as U.S. Pat. Nos. 2,409,353; 3,692,864; and 2,698,281; to name just a few of the most basic of these publications.

In a typical FCC process flow, finely divided regenerated catalyst leaves the regeneration zone at a certain temperature and contacts a feedstock in a lower portion of a reaction riser zone. While the resulting mixture, which has a temperature of from about 600° to about 1000° F., passes up through the riser, conversion of the feed to lighter products and to coke deposited on the catalyst occurs. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone, known in the art as the main column, wherein the hydrocarbon effluent is separated into such typical fractions as light gases and gasoline, light cycle oil, heavy cycle oil and surry oil. Various fractions from the main column can be recycled along with the feedstock to the reaction riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, countercurrently contacts the spent catalyst purging adsorbed and interstitial hydrocarbons from the catalyst. The spent catalyst containing coke leaves the stripping zone and passes into a regeneration zone, where, in the presence of fresh regeneration gas and at a temperature of from about 1150° to about 1400° F., combustion of coke produces regenerated catalyst having a carbon content of from about 0.01 to about 0.5 wt. % and flue gas containing carbon monoxide, carbon dioxide, water, nitrogen and perhaps a small quantity of oxygen. Usually, the fresh regeneration gas is air, but it could be air either enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, which is the preferred mode of operation, the flue gas passes directly to sensible heat recovery means and from there to a refinery stack. Regenerated catalyst which was separated from the flue gas is returned to the lower portion of the regeneration zone which is maintained as a dense bed of spent catalyst. Regenerated catalyst leaves this dense bed and, as previously mentioned, contacts the feedstock in a reaction zone.

We have found that the novel catalytic composite of our invention is particularly advantageous for use in the FCC process because it enables improved conversion of the hydrocarbon charge stock to desirable products while reducing coke production. Without being limited to any theory, it is our hypothesis that the advantageous effect of our catalytic composite is due to an interaction between the rare earth ions and the acid sites present in the carrier material which is not achieved by methods of the known art particularly U.S. Pat. No. 3,556,988. Acid sites on the carrier material, which will be discussed in greater detail hereinbelow, are known to contribute to the undesirable coke producing cracking reactions. There are also acid sites on the zeolite, but they effect the reactions that produce the desirable products.

For purposes of simplicity in the following discussion concerning acid sites, aluminum is representative of any tri-valent metal, and silica any quadra-valent element.

The product of the reaction of aluminum ion and silica hydrogel forming a hydroxylated complex like the carrier material of the catalytic composite of the present invention in which both silicon and aluminum assume tetrahedral coordination is responsible for the high acidity of the complex. In the simplest form, the ionized complex unit may be pictured as follows:

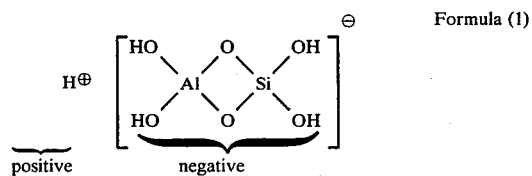

Formula (1)

The tetrahedrally coordinated aluminum ion attains a net negative charge which in turn may be balanced by a proton. Formula (1) can be re-pictured to show the exact location of the charge balance as below:

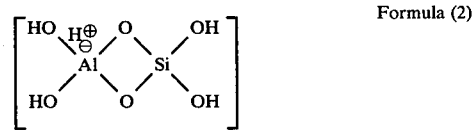

Formula (2)

Formula (2) indicates that the negative charge of the ionized complex unit most probably is located adjacent to the aluminum atom. Therefore, an acid site is created where a proton is needed to balance the charge. This acidity is extremely important, since it determines the degree of cracking activity and stability of the amorphous silica-alumina matrix in an FCC catalyst.

Numerous complex units as shown in Formula (2) combine to produce a silica-alumina gel matrix via polymerization. A portion of this polymerized complex is pictured as below:

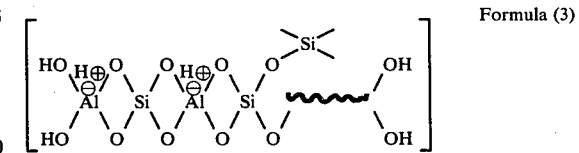

Formula (3)

Formula (3) is a basic constructing complex (three dimensional) for the matrix. These complexes may commingle to form a unique matrix entity. The probability for silicon and aluminum ions to form an ordered tetrahedra coordination is low. It is more like the case of random copolymer where the change of aluminum ions being attached next to silicon ions depends on the concentration of the individual ions, the mixing intensity, the mobility of the ions and the pH of the environment. It is one of the reasons that an amorphous silica-alumina matrix always shows lower acidity than the ordered aluminosilicate zeolite. In the case of zeolite, the arrangement of silicon and aluminum ions are in a way to show high acidity, but, as mentioned before, the high acidity of zeolite is desirable.

Any tri-valent metal atoms can be admixed with quadra-valent ions to form an acid site. However, one acid site may show different acid strength (acidity) from another. It is not clear at this time what causes the acidity variation.

The variation of acidity in a matrix may mostly depend on the location of the tri-valent metals, such as alumina in the complex of Formula (3). An aluminum atom surrounded by a series of many silicon atoms may show higher acidity than one that is surrounded by only few silicon atoms. In other words, the electron configuration of an aluminum atom may well be affected by its adjacent atoms. In any event, the order of silicon atom and aluminum atom in a polymerized complex will dictate the acid strength.

Zirconium, like silicon, has a valence of four after calcination. It has larger molecular size (MW for Zr is 91 and MW for Si is 28) than silicon. Therefore when zirconium replaces silicon in the polymerized complex of Formula (3), the bond distance may be longer. Also, the electron configuration around the aluminum atom may be quite different in the presence of zirconium. The presence of zirconium ions during hydrolysis may affect the rearrangement of silicon-aluminum so that its final acidity is more intermediate.

Rare earth ions are known to the art to be adsorbed on the acid sites of zeolites upon rare earth exchange. The bond strength between rare earth ion and negative charge aluminum is apparently stronger than that between the exchanged sodium and negative charge aluminum. In other words, rare earth ions have preferential adsorption as compared to the mono-valent or di-valent ions. This ion exchange is known as a means to moderate the acid strength of the zeolite.

We believe that rare earth ions are also able to moderate the acid strength of the matrix or carrier material. However, because in the known ion exchange procedures almost all excess rare earth is washed away prior to calcining, the rare earth ions are not available to moderate the carrier material acidity in the FCC reaction zone. By providing, as in the present invention, a minimum concentration of rare earth ions in the carrier material, the availability of the rare earth ions to interact with the carrier material acid sites in the FCC reaction zone is assured.

It should be mentioned at this point that adding rare earths to the hydrogel comprising the catalyst precursor as described in the aforementioned U.S. Pat. No. 4,107,088, does not reduce the acid sites on the catalyst, which reduction can be achieved only by the method of the present invention, i.e. treating the FCC catalyst powder with the rare earths subsequent to its formation.

The following non-limiting examples illustrate a preferred embodiment of the method of manufacturing the catalytic composite of the present invention, the differences in composition between the catalytic composite of the present invention and the known art, and the superior results achieved by the catalytic composite of the present invention.

EXAMPLE I

This example first illustrates the preparation of a conventional FCC catalytic composite and then the preparation of the catalytic composite of the present invention for which the conventional composite is a precursor.

An FCC catalyst with 20 wt. % Y type zeolite and 80 wt. % matrix on a dry basis was prepared as follows. The matrix has a volatile free composition of 72.4 wt. % $SiO_2$, 24.2 wt. % $Al_2O_3$ and 3.4 wt. % $ZrO_2$.

1. 32 pounds of aluminum sulfate was added to Tank A, which contained 41 pounds of deionized water, and stirring was begun;
2. 73 pounds of water glass containing 24 wt. % $SiO_2$ was added to Tank B which contained 174 pounds of deionized water at 100° F. Stirring was begun and the temperature was maintained at 100° F. by hot water circulation through the tank jacket.
3. 35 pounds of 25 wt. % sulfuric acid was added to Tank A and the solution temperature was raised to 100° F.;
4. The water glass solution in Step 2 was slowly pumped into the aluminum sulfate solution of Step 3;
5. 908 grams of zirconyl chloride was added to Tank C which contained 10 pounds of deionized water and slow agitation was begun;
6. The zirconium slurry in Step 5 was added to the silicon-aluminum solution in Step 4, and the pH was raised from about 3 to 3.6 by adding 6½ pounds of 15 wt. % ammonia;
7. 2770 grams of SK-42 powder (a rare-earth exchanged Y zeolite from Union Carbide) was added to a container with 25 pounds of deionized water, the resulting slurry was gently stirred and the pH adjusted to 4.5 by adding an acetate buffer solution of acetic acid and sodium acetate;
8. The zeolite slurry in Step 7 was added to the silicon-aluminum-zirconium slurry from Step 6, and the pH thereafter raised to 8.0 by adding 33 pounds of 15 wt. % ammonia solution;
9. The mixture of Step 8 was aged for 5 hours at 8.0 pH and 100° F. temperature;
10. The slurry in Step 9 was filtered and 140 pounds of deionized water added to obtain a slurry for spray drying;
11. The slurry was spray dried in a spray drying apparatus at a temperature of 1000° F. and a pressure of 600 psig.;
12. 800 grams of the spray dried powder from Step 11 was added to a washing vessel which contained 4.2 pounds of 15 wt. % ammonia and 15.8 pounds of ammonium nitrate in 60 pounds of deionized water @160° F., the solution was mixed with the spray dried powder for 15 minutes by gentle agitating, and the powder was filtered;
13. The washing procedure of Step 12 was repeated three times;
14. The powder was washed with 90 pounds of hot water at 160° F. twice to remove ammonia/nitrate ions;
15. The powder was divided into two equal parts, the first part, for further processing to make the catalyst of the present invention; the second part was calcined in a rotary kiln at 1100° F. for 2 hours to obtain a conventional FCC zeolite catalyst (coded FC-1-341);
16. 4000 grams of the filter cake comprising the first part of the powder from Step 15 (FC-1-342) was added to a vessel which contained 120 grams of lanthanum enriched rare earth chloride in 45 pounds of deionized water at 160° F.;

17. The resultant slurry was mixed for 1 hour and filtered, but not washed;

18. The filtered powder was calcined in a rotary kiln at 1100° F. for 2 hours to obtain the catalyst of the present invention (coded FC-1-342).

Following is the analysis obtained of the catalysts prepared by the above procedure as well as the zeolite (SK-42) used in the preparation:

| Catalyst Code | FC-1-341 Conventional | FC-1-342 (present invention) | SK-42 |
|---|---|---|---|
| Y Zeolite, wt. % | 20 | 20 | 100 |
| Rare Earth Analysis | | | |
| Nd, wt. % | 0.60 | 1.52 | 3.45 |
| Pr, wt. % | 0.30 | 0.70 | 2.20 |
| Ce, wt. % | 0.29 | 0.76 | 1.79 |
| La, wt. % | 1.34 | 3.05 | 8.20 |
| Total | 2.53 | 6.03 | 15.64 |
| Wt. % LOI (loss on ignition) @ 900° C. | 3.7 | 3.7 | 1.7 |
| Na$_2$O, wt. % VF (volatile free) | 0.17 | 0.11 | 4.05 |
| (RE)$_2$O$_3$, wt. % VF | 2.96 | 6.96 | 17.65 |
| SiO$_2$, wt. % VF | 68.80 | 66.42 | 56.73 |
| Al$_2$O$_3$, wt. % VF | 25.40 | 23.85 | 21.57 |
| ZrO$_2$, wt. % VF | 2.67 | 2.66 | 0 |
| Total | 100.00 | 100.00 | 100.00 |
| Concentration of rare earth ions in matrix wt. % VF | 0 | 4.375 | — |

The concentration of rare earths in the matrix of FC-1-342 was calculated by assumming that the rare earth content in the zeolite of FC-1-342 was identical to that of the zeolite in FC-1-341. This assumption appears reasonable since a specific zeolite may be ion exchanged only to a certain specific extent. The calculation would therefore be: $(6.03-2.53) \div 90 = 0.04375$ or 4.375 wt. %.

Similar calculations to determine matrix rare earth content were made from data given in Examples 1 and 2 of U.S. Pat. No. 3,556,988. In Example 1, as previously discussed, the zeolitic catalyst is ion exchanged subsequent to spray drying with a rare earth solution, while in Example 2, no such subsequent treatment is given. The rare earth oxide content of the Example 1 catalyst is 2.50 wt. % and that of Example 2 is 1.60 wt. %. Assuming that the zeolite component in the catalyst of Example 1 has the same amount of rare earth associated with it as the zeolite of the Example 2 catalyst, i.e. the maximum ion exchanged amount, the matrix of the Example 1 catalyst contains about 1.0 wt. % rare earth oxide $(2.50-1.60) \div 90$ which calculates to be about 0.85 wt. % rare earth ions. Such result may be compared to the catalytic composite of the present invention which requires a minimum of about 1.00 wt. % rare earth content in the matrix or a weight ratio of rare earth ions to matrix greater than 1.0:100.0.

EXAMPLE II

This example sets forth comparative data obtained in FCC pilot plant evaluations of the catalytic composite of the present invention (FC-1-342) which was steamed at 1475° F. to simulate catalyst deactivation, and two typical commercial zeolitic equilibrium FCC catalysts, the latter being designated CBZ-1 and F-87. For each evaluation 270 grams of the catalyst being evaluated was loaded into the pilot plant. The operating conditions for each evaluation included a catalyst to oil ratio of 3.06 and a reactor temperature of 1025° F. The feedstock used in each case was a reduced crude (Gach Saran). Following is a compilation of the results of the pilot plant evaluations.

| Catalyst Code | FC-1-342 | CBZ-1 Equilibrium Commercial | F-87 Equilibrium Commercial |
|---|---|---|---|
| Catalyst Pretreatment | steamed @1475° F. | — | — |
| Run No. | 3084 | 2830 | 2705 |
| Feedstock | Gach Saran | Gach Saran | Gach Saran |
| Conversion, Vol. % | 75.9 | 78.0 | 74.6 |
| C$_5$-EP Gasoline, vol. % | 43.9 | 40.0 | 42.3 |
| Product Distribution, wt. % | | | |
| C$_3$- | 10.5 | 10.0 | 9.6 |
| C$_4$ | 8.8 | 8.4 | 7.0 |
| C$_5$-EP Gasoline | 37.7 | 35.8 | 37.0 |
| Cycle Oil | 26.4 | 26.7 | 29.5 |
| Coke | 16.6 | 19.1 | 16.9 |

It can be seen from the above data that the catalytic composite of the present invention (FC-1-342) achieves the highest gasoline product and lowest coke made of the three catalysts tested. Such is the case even with regard to the F-87 catalyst which shows a conversion less than that for the FC-1-342, but still a lower gasoline product and higher coke make. Thus, the unique catalytic composite of the present invention is clearly superior to the catalysts of the known art.

We claim as our invention:

1. A method of catalyst manufacture which comprises:
   (a) preparing a catalyst powder comprising a zeolite crystalline aluminosilicate dispersed in a porous carrier material consisting essentially of silica, zirconia and alumina;
   (b) mixing said powder with a sufficient amount of an aqueous solution of a water soluble rare earth salt to form a slurry of said catalyst powder, the stoichiometric excess concentration of said rare earth salt in the solution being sufficient to impart to the final catalyst a weight ratio on a volatile free basis of rare earth ions to said carrier material greater than 1.0:100.0;
   (c) filtering or centrifuging said slurry to separate therefrom a filter cake containing said catalyst powder; and;
   (d) calcining said filter cake without washing or drying said filter cake and recovering the resultant catalytic composite.

2. The catalytic composite of claim 1 wherein said zeolitic crystalline aluminosilicate comprises a rare earth ion exchanged Y-zeolite.

3. The catalytic composite of claim 1 wherein said rare earth comprises lanthanum.

4. The method of claim 1 wherein said zeolite crystalline aluminosilicate comprises a rare earth ion exchanged Y-zeolite.

5. The method of claim 1 wherein said rare earth comprises lanthanum.

6. The method of claim 1 wherein said rare earth salt comprises rare earth chloride.

7. The method of claim 1 wherein said calcining is effected at a temperature of from about 200° C. to about 750° C. and a calcining without washing or drying said filter cake time of from about 30 minutes to about 5 hours.

8. The method of claim 1 wherein said catalyst powder is obtained as a filter cake from an ion exchange procedure whereby sodium ions contained in the catalyst are exchanged with ammonium ions in an aqueous medium.

* * * * *